Aug. 10, 1926.
A. MOORE
CONVERSION VALVE
Filed Oct. 30, 1922
1,595,113
2 Sheets-Sheet 2
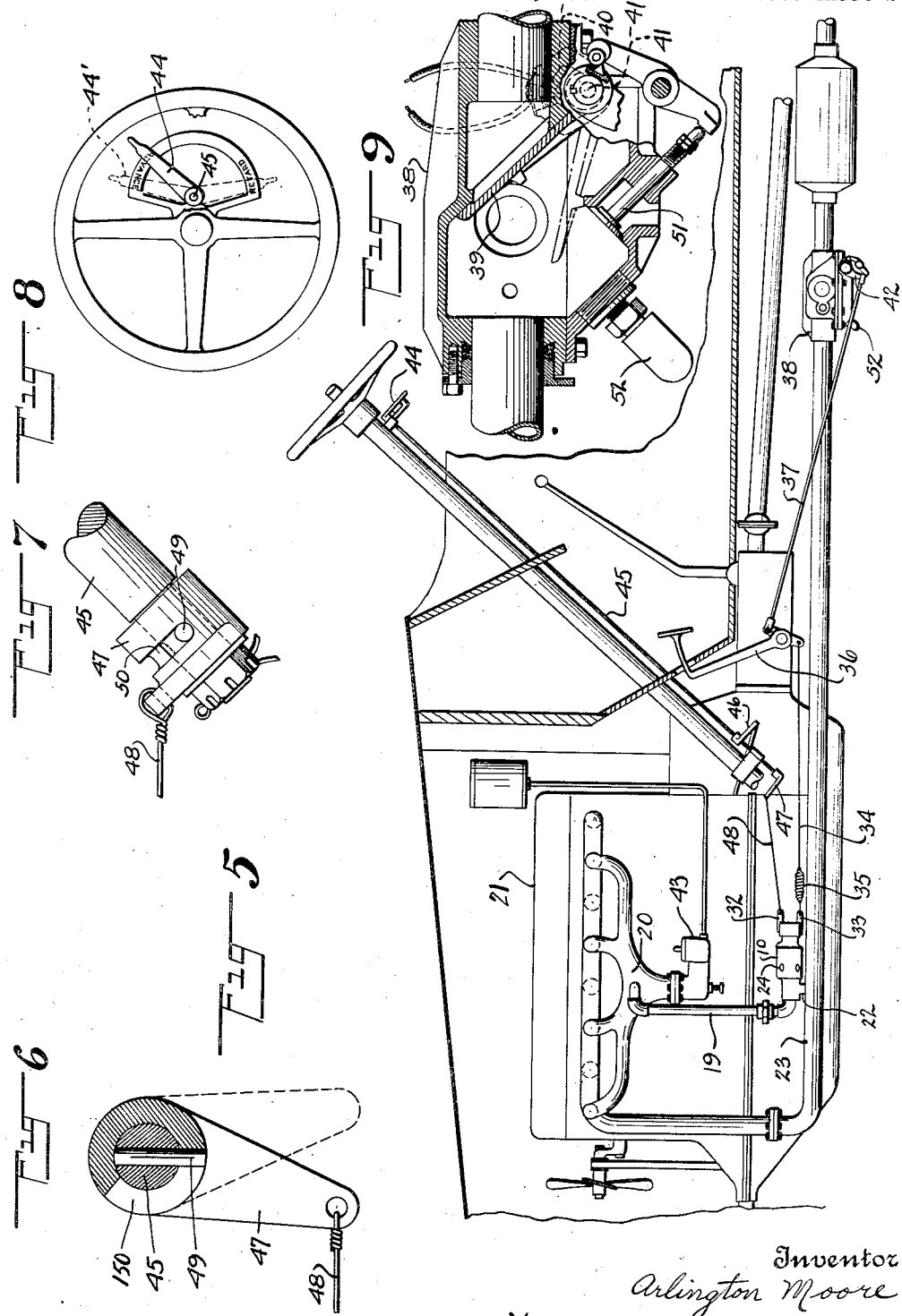
Inventor
Arlington Moore
By His Attorney
H. H. Dyke Patented Aug. 10, 1926.

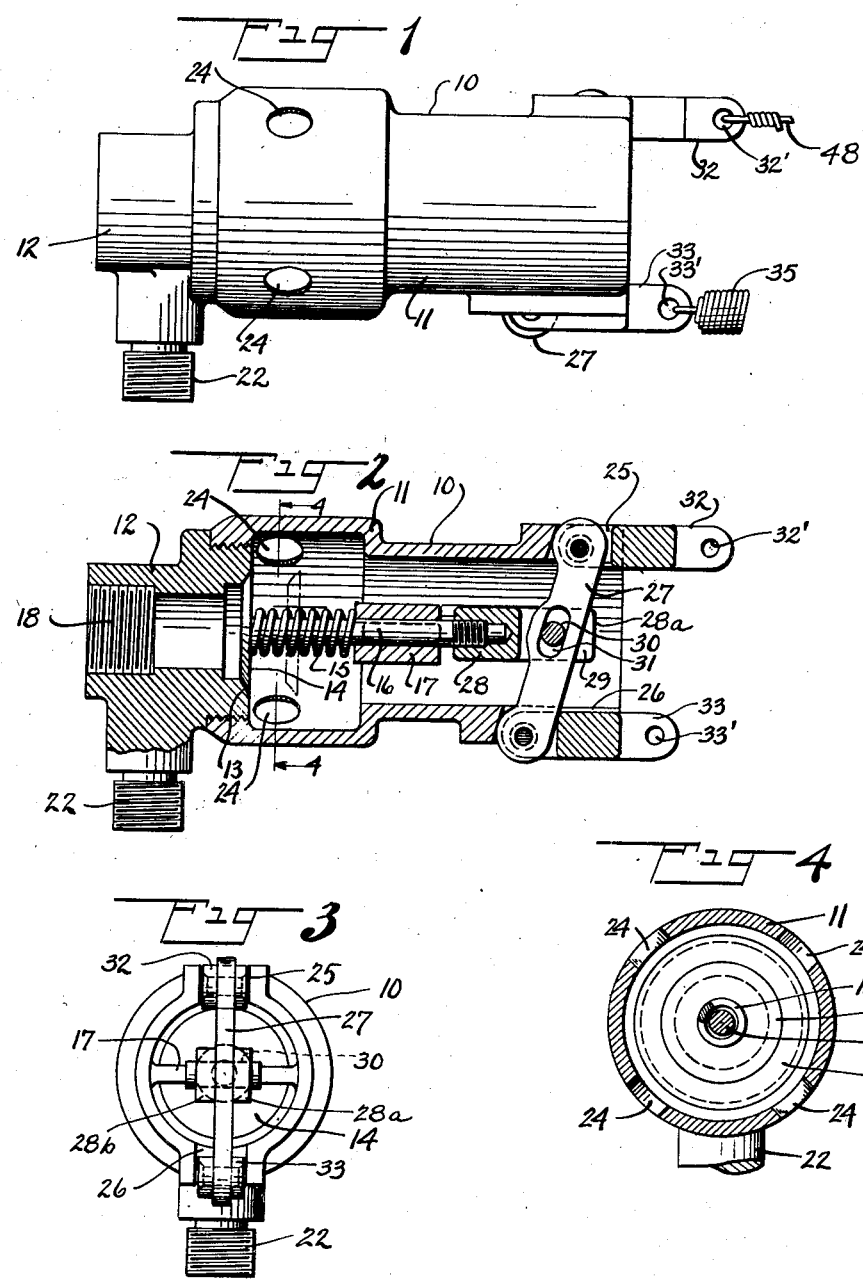

1,595,113

UNITED STATES PATENT OFFICE.

ARLINGTON MOORE, OF NEW YORK, N. Y., ASSIGNOR, BY MESNE ASSIGNMENTS, TO MAXMOOR CORPORATION, A CORPORATION OF DELAWARE.

CONVERSION VALVE.

Application filed October 30, 1922. Serial No. 598,051.

My invention relates to a valve for increasing the volume of compression charges in an internal combustion engine at times when the engine is to be operated as a gaseous fluid compressor, and used in connection with a gaseous fluid brake, such as described and claimed in my copending applications, Serial No. 559,675, filed May 9, 1922, and Serial No. 605,361, filed Dec. 7, 1922.

One object of the invention is to provide means whereby the volume of gases entering the cylinders of an internal combustion engine on the induction stroke is increased, thereby causing a corresponding increase in the efficiency of the gaseous fluid brake operated by running the engine temporarily as a compressor.

Another object of the invention consists in the provision of means for supplying additional air into cylinders of the internal combustion engine on the induction stroke when the engine, being used in its ordinary capacity of providing a source of power, is running at high speed. Other objects of the invention will appear from the following description.

In the accompanying drawings, I have illustrated an embodiment of my invention, but same is for illustration only and for affording an understanding of the invention and not for limitation thereof. Fig. 1 is a side elevation of the conversion valve device. Fig. 2 is a longitudinal sectional view. Fig. 3 is a right end view. Fig. 4 is a section on the line 4—4, Fig. 2. Fig. 5 is a part sectional view showing the conversion valve and gaseous fluid brake in position on an automobile chassis. Figs. 6, 7 and 8 are detail views showing how the valve may be controlled by the spark lever, and Fig. 9 is a sectional view of the gaseous fluid brake illustrated in Fig. 5.

Reference numeral 10 is applied to designate the hollow valve casing generally. Same is made in two parts and comprises the principal casing member 11, which is hollow from end to end, and the valve seat member 12, which is screwed into the casing member 11 at one end thereof. Valve seat member 12 is provided with a valve seat 13, in which is seated the valve 14 of the poppet type normally held to its seat by spring 15, and the stem 16 thereof being guided in the valve guide 17, which is supported by, and preferably formed as in integral part of, the valve casing member 11. The vale seat member 12 has a threaded opening 18 formed therein and serves to connect therewith the pipe 19 (Fig. 5), which at its opposite end is screwed into the intake manifold 20 of the internal combustion engine 21. The valve seat member 12 is provided with a supporting device for the conversion valve casing, and in the form shown is provided with a downwardly extending threaded lug 22 adapted to be screwed into an opening provided to receive same in any suitable supporting means, such as in the exhaust conduit 23. The air which enters casing 10 and passes valve 12 is heated by exhaust conduit 23 and also by conduction of heat from the exhaust gases to casing 10 which keeps the latter nearly as hot as the exhaust conduit itself.

The valve casing member 11 is provided with air inlet holes 24, 24 and has two slots, 25, 26 formed in the opposite sides thereof at the end remote from the valve seat member 12. An operating lever 27 has its ends in these slots and is connected intermediate its ends with the valve 14. In the form shown, a yoke 28 having a screw threaded connection to the valve stem 16 is provided with an elongated slot 29, through which the lever 27 is passed, and a pin 30 extending through the arms 28ª and 28ᵇ of the yoke 28 and through a slot 31 in the lever 27 serves to provide means of connection between the lever 27 and valve 14. Fastening pieces 32, 33 are secured to the respective ends of control lever 27 and are provided with holes 32' and 33' for the convenient attachment thereto of wires or equivalent actuating devices. It will be seen that valve 14, normally held closed by spring 15, may be opened against its spring by pull exerted on either one or both of the fastening pieces 32, 33.

The fastening piece 33 is preferably made use of for interconnecting the conversion valve with the gaseous fluid brake or with control means therefor. In the form shown, said member 33 is connected by a wire 34, having a spring 35 between its ends, to the brake lever 36, to which is also connected the actuating link 37 of the gaseous fluid brake 38. On pushing the brake lever 36 with the foot, the cut-off valve 39 of the gaseous fluid brake 38 is closed, as shown in full lines in Fig. 9, and the ignition cut off by means of the movable switch member 40 attached to the shaft 41 of valve 39, the movement of link 37 being communicated to shaft 41 to rotate same through the crank 42. The same movement of the lever 36 also serves to open valve 14 and thereby to admit additional air to the intake manifold 20 above the carburetor 43, and the engine, now being run as a compressor with the ignition cut off, is enabled to function with increased efficiency as an air compressor by reason of the additional quantities of air admitted upon the induction stroke, and furthermore, relatively small quantities of fuel are drawn through the carburetor during the time while valve 14 is open and the engine is being operated as a compressor and in connection with the gaseous fluid brake. The reference made in my claims to the admission of air directly into the intake manifold is used to indicate admission of such air into the intake manifold at a point beyond the carburetor, such air passing directly into the intake manifold not through the carburetor. Provision of the spring 35 is of advantage as it permits brake pedal 36 to be turned to a considerable angle without producing unduly great travel of valve 14 in its opening movement.

As already stated, the device of the present invention may be used to draw additional air into the engine cylinders on the intake stroke when the engine is being run in the usual manner as a source of power. This is particularly useful for securing economy on high engine speeds. Inasmuch as when the engine is running rapidly the spark control lever is always in the advanced position, I preferably make the connection for operating the valve when it is to be used for this purpose so that same can be operated by the ignition or spark control lever. In the form shown, such spark control lever is indicated at 44, and serves to turn the rod 45, which has the spark advance crank 46 secured thereto also serves to actuate the crank 47, which is connected as by a wire 48 to the fastening piece 32.

Since it is not desirable to supply additional air on the intake stroke at ordinary engine speeds, the connection between rod 45 and crank 47 is preferably made to provide for lost motion there-between, so that the valve 14 is opened only at high engine speeds. In the form shown, pin 49 passing through rod 45 enters an elongated transverse slot 50 in the crank 47 and same is so arranged that the valve 14 remains closed until the spark control lever 44 is advanced beyond the position of normal advance, as indicated in full lines in Fig. 8, and when advanced still further and beyond the normal advance, such as indicated in dotted lines at 44' in Fig. 8, the valve 14 is opened somewhat to admit additional air to the intake manifold above the carburetor. The precise amount of opening of valve 14 can, of course, be controlled by varying the position of extra advance of the spark lever, as will be apparent from the showing of Fig. 8.

The braking apparatus may be of a variety of constructions, so long as it is operated by interposing a cut-off valve in the exhaust conduit and shutting off the engine ignition. The particular form of braking device shown here for purpose of illustration generally comprises in addition to the parts already referred to, a relief valve 51 which is actuated in connection with the cut-off valve 39 and also preferably provides a safety valve 52, which may be set to blow off at any given pressure. It is to be understood that the invention of the present application is not in any way limited by the particular details of the compression brake device.

It will be seen that the present invention is of great utility in that means are provided for securing a leaner mixture at high engine speeds without disturbing the normal carburetor adjustment and that no additional or separate means for control are required beyond those ordinarily supplied in apparatus of this character. The invention is also of great utility in connection with the gaseous fluid brake apparatus for braking or stopping vehicles. The depression of the brake pedal causes the ignition circuit to be broken and the exhaust conduit to be closed by the valve in the gaseous fluid brake. In this way the engine is transformed into a compressor to compress the charges which continue to be drawn into the engine on the induction stroke, but are not ignited, the ignition being cut off. There is usually no need with light or pleasure vehicles to increase the volume of compression charges for braking purposes, the air admitted through the carburetor being ordinarily sufficient for this purpose. In heavy vehicles or in vehicles carrying heavy loads, however, the charges drawn through the carburetor into the cylinders to be compressed are relatively small and insufficient to effectively stop the vehicle, and furthermore it is desirable with either light or heavy automotive vehicles to close the throttle at such times in order to prevent waste of fuel. When the engine is used in this way, the second function of the present invention is of vital importance, in that additional quantities of air are admitted into the intake manifold through valve 14, so that the aggregate charges drawn into the cylinders both through the conversion valve and through the carburetor are substantially larger than could be obtained through the carburetor alone, and if desired, the passage through the carburetor may be completely or substantially shut off by closing the throttle, thereby saving fuel and substantially all the air necessary for securing efficient compression and braking action may be supplied through the conversion valve of the present invention. In case extremely high braking power is required, the throttle may, of course, be opened together with the additional air valve in order to secure the high compression desired at such time, but this is, of course, accompanied by more or less waste of fuel, which can ordinarily be avoided by closing the throttle and opening the additional air valve at times when the engine is being used as a compressor for braking purposes. When the valve 14 is closed the carburetor serves its usual purpose and there is no interference with or upsetting of carburetor adjustments.

Modifications and changes may be resorted to within the scope of my claims by which the invention is defined, without departing from my invention. For example, the valve control instead of being connected from the spark control lever may be operated from other control means, as, for example, it may be interconnected with the throttle control lever.

I claim:

1. In an automotive vehicle, an internal combustion engine, means for simultaneously breaking the ignition circuit and closing the engine exhaust conduit to convert the engine into a compressor, and means interconnected with the said means to admit additional quantities of air beyond the carburetor to increase the volume of the charges when the engine is acting as a compressor, the last named means being also interconnected with the spark control to admit additional quantities of air beyond the carburetor into the engine cylinders when the engine is being operated at high speeds to drive the vehicle.

2. In an internal combustion engine driven automotive vehicle, a hollow tubular valve casing open at one end and adapted at the other end to be connected to the engine intake manifold, air holes provided in the side walls of said valve casing, means on the outside of the valve casing to attach same to the exhaust manifold or other part of the engine, a valve seat in the end of the valve casing opposite the open end, a spring opposed poppet valve arranged longitudinally of the valve casing and spring closed against said valve seat, a rocker arm fastened to the stem end of said valve and adapted to slide in slots provided in the open end of the valve casing, and independent means applied to the opposite ends of the rocker arm to open said valve.

3. The combination with an internal combustion engine of a valve for shutting off escape of exhaust gases, and means for admitting additional air into the intake pipe between the carburetor and engine cylinders without cutting off air intake through the carburetor.

4. In an automotive vehicle, an internal combustion engine for supplying the power to drive the vehicle, means for closing the engine exhaust conduit to convert the engine into a compression brake, and means interconnected with the first named means to admit additional quantities of air beyond the carburetor when the engine is acting as a compressor, and a second control means for said air admission means, whereby same can also be operated to admit air to the intake pipe when the engine is being operated to drive the vehicle.

In testimony whereof, I have signed my name hereto.

ARLINGTON MOORE.